L. H. OBERREICH.
SHOCK ABSORBER.
APPLICATION FILED MAY 29, 1918.

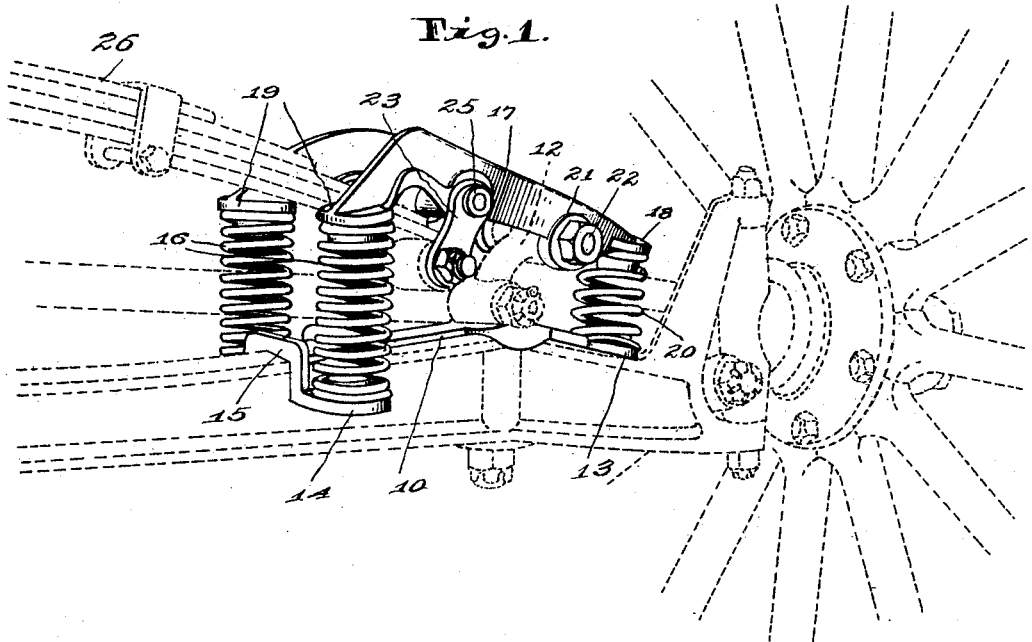
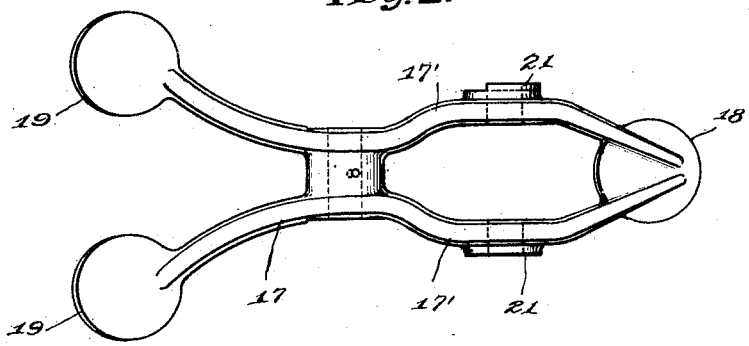
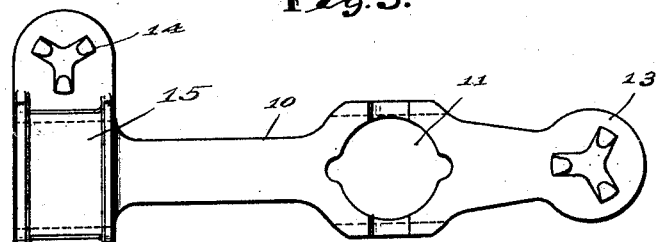

1,414,094.

Patented Apr. 25, 1922.
2 SHEETS—SHEET 2.

Witness
Frank A. Fahle

Inventor
Louie H. Oberreich,
By
Hood & Schley
Attorneys

UNITED STATES PATENT OFFICE.

LOUIE H. OBERREICH, OF INDIANAPOLIS, INDIANA.

SHOCK ABSORBER.

1,414,094.    Specification of Letters Patent.    Patented Apr. 25, 1922.

Application filed May 29, 1918. Serial No. 237,239.

*To all whom it may concern:*

Be it known that I, LOUIE H. OBERREICH, a citizen of the United States, residing at Indianapolis, in the county of Marion and State of Indiana, have invented a new and useful Shock Absorber, of which the following is a specification.

The object of my invention is to produce a shock absorber having the fundamental characteristics of the shock absorber covered by Letters Patent of the United States, No. 1,205,373, issued to B. F. and J. Martz, November 21, 1916, but so formed and modified as to be readily applicable to well known forms of automobiles now on the market and so as to eliminate some slightly objectionable features which existed under some circumstances in the Martz device.

Figure 4:
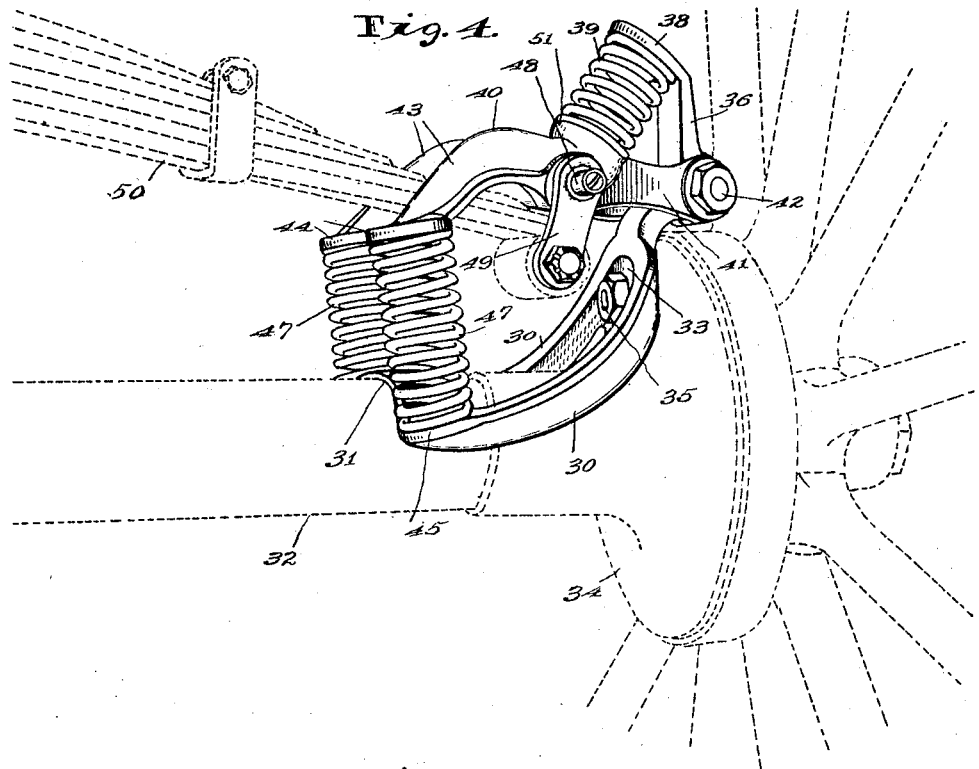

The accompanying drawings illustrate my invention. Fig. 1 is a perspective view of my improved shock absorber in the form which has been found to be conveniently applicable to the front axles of Ford cars, adjacent cooperating portions of the car being shown in dotted lines; Fig. 2 is a plan of the upper or load-carrying member of the shock absorber shown in Fig. 1; Fig. 3 is a plan of the lower or saddle member of the shock absorber shown in Fig. 1; Fig. 4 is a perspective view of my improved shock absorber in the form specially designed for attachment to the rear axle of a Ford car, adjacent cooperating portions of the car being shown in dotted lines; and Fig. 5 a side elevation in partial vertical section of the parts shown in Fig. 4.

In the drawings, 10 indicates a saddle casting which is designed to be laid upon the upper surface of the front axle of a Ford car. This saddle member is provided with an eye 11 which is capable of registering with the vertical eye which receives the regular shackle pin 12 (see dotted lines Fig. 1). The saddle 10 is also provided at its outer end with a spring seat 13 and at its forward end with two spring seats 14, 14, which are connected by a yoke 15 formed to straddle the front axle, the arrangement being such that the spring seats 14 may lie below the upper level of the axle and thus provide sufficient space for springs 16, 16. Cooperating with the saddle member is a load-carrying member 17, which is provided at one end with a spring seat 18 and at the other end with two separated fingers 19, 19 which form spring seats to engage the upper ends of springs 16. A spring 20 is arranged between seats 13 and 18. At an intermediate portion in its length the load-carrying member 17 is provided with laterally separated portions 17′, 17′, carrying laterally-presented bosses 21, 21 which are transversely bored to receive the pivot bolt 22 which, in the Ford car, is provided to form the pivotal connection between the shackle pin 12 and the shackle 23. The side bars 17′, 17′ are laterally separated enough to permit the upper end of the shackle pin 12 to fit snugly between the arms, the bolt 22 passing through the bosses 21 and the shackle pin. At a point between bosses 21 and spring seats 19, the load-carrying member 17 has a transverse dimension equal to the width of the shackle pin eye and is transversely bored so that the regular shackle 23 may be coupled to the load-carrying member 17 by means of a bolt or pin 25. The arrangement and proportion of parts is such that, in order to attach my device to the front axle of a Ford car, it is first necessary to disconnect shackles 23 from shackle pins 12. The shackle pins 12 are then removed from the front axle and detached from their reach rods, whereupon the shackle pins are transferred from left to right and right to left and associated with the adjacent reach rods. Their lower ends are then passed downwardly through the adjacent eyes 11 of saddle 10 and their upper ends, being directed upwardly and outwardly instead of upwardly and inwardly, may be fastened by the bolts 22 between the arms 17′ of the load-carrying member 17. The shackles 23 are then connected at their upper ends by pin 25 with the load-carrying member 17.

By this arrangement, the regular load-carrying leaf spring 26 of the car occupies precisely the same relation to the front axle as it did in the standard construction, and the axes of the steering wheels are thereby retained in proper vertical position. This is an important construction, because if any effort is made to materially vary the height of the spring 26 above the axle, the axle becomes tilted and the pivotal axes of the steering knuckles become thrown out of the vertical owing to the fact that in this type of car the front axle is connected to the body of the vehicle by reach rods. Of course, any material deflection of the axes of the steering knuckles from the vertical will cause the steering wheels to swing in planes which are not parallel with the ground and under such circumstances, there would be a tendency, after the steering wheels have been turned to one side or another, to suddenly be further deflected in the same direction by the applied load of the vehicle, thus rendering it very difficult, and even dangerous, to steer the car. By the arrangement shown, it is possible to provide two of the springs 16, upon which the load normally rests, and all of the springs may be considerably longer than would be possible in the precise form of apparatus shown in the Martz patent, and, therefore, a more efficient absorber is obtained without the possibility of displacing the axes of the steering knuckles from their proper vertical positions. The structure also is more securely held in place and is held in place by the single fastening means of the shackle pin.

Figure 5:
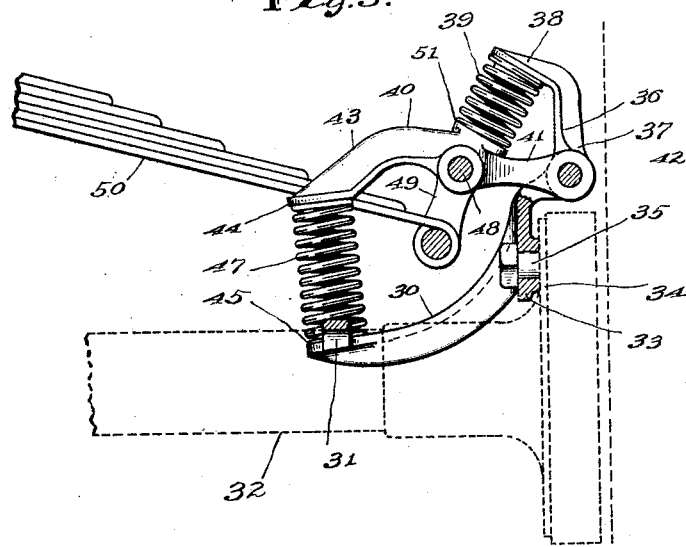

In order to obtain the same advantages in the absorbers for the rear axle and in order to make them readily attachable to Ford cars, I have provided the form shown in Figs. 4 and 5. Here the saddle member is provided at one end with a yoke 31 which straddles and rests upon the tubular portion of the rear axle 32. Extending outwardly from the yoke 31 are parallel arms 30 which are connected at their ends by a cross plate 33 adapted to lie against the brake band head 34. This plate 33 is perforated to receive a fastening bolt 35 which receives the nut regularly provided in the Ford car for holding the rear shackle fingers in place.

Extending upwardly from plate 33 is an arm 36 which is provided with an eye 37 having a perforation parallel with the axis of the car, i. e., at right angles to the axis of the rear axle. At its upper end the arm 36 is provided with an inwardly-extended finger 38 which forms a seat for the spring 39. The load-carrying member 40 of this form of the shock absorber is provided at its outer end with a pair of parallel arms 41 which straddle eye 37 and are correspondingly perforated so as to receive the hinge bolt 42. At its opposite end the load-carrying member 40 is provided with a pair of parallel arms 43, each of which is provided at its outer end with a spring seat 44. Each side of the yoke 31, at the inner ends of the arms 30, there is a spring seat 45 and between each spring seat 45 and the corresponding spring seat 44 is a spring 47. At an intermediate point in its length, the load-carrying member 40 is provided with a transverse perforation adapted to receive a hinge pin 48, by means of which the regular shackle 49 of spring 50 may be attached to the load-carrying member. Upon its upper side, the load-carrying member 41 is provided with a spring seat 51 which receives the lower end of spring 39. The parts are so proportioned that the upper end of the shackle 49 occupies the same relative position to spring 50 and the rear axle 32 that it would if the regular shackle finger commonly found on the Ford car were secured in place by bolt 35.

In the form of shock absorber shown in Fig. 1, the two springs 16 primarily carry a proportionate portion of the load of the body of the vehicle and are placed under compression thereby. These springs, however, have an initial compression which is counter-balanced by an initial compression of the spring 20 and, in order that these oppositely acting springs may dead-beat each other, it is desirable that the period of vibration of springs 16 be different from the period of vibration of spring 20. The same is true of the form shown in Fig. 4, springs 47 assisting in carrying the normal load of the vehicle, while spring 39 is arranged in opposition to these springs.

I claim as my invention:

1. A shock absorber comprising a saddle piece adapted to lie upon an automobile axle and provided with a portion through which the fastening portion of a shackle pin may be passed, a load-carrying member formed for pivotal attachment to such shackle pin, said load-carrying member being formed to receive the shackle of the load-carrying spring of the automobile, a spring arranged to take the downward thrust of the load-carrying member, and another spring arranged to take the upward thrust of the load-carrying member, said two springs acting simultaneously upon the load-carrying member in opposite directions relative to its pivotal support on the shackle pin.

2. A shock absorber comprising a saddle member formed to lie upon an automobile axle and provided with a portion through which the fastening portion of a shackle pin may be passed, and also provided with a portion straddling the automobile axle and forming two upwardly-presented spring seats one at each side of the axle, a load-carrying member formed for pivotal attachment to the shackle pin, said load-carrying member having a pair of separated spring seats alined with the spring seats of the saddle member and separated to straddle the load-carrying spring of the automobile, said load-carrying member being formed to receive the shackle of the load-carrying spring and also having a third spring seat, two springs arranged between the saddle member and the load-carrying member to receive the vertical load of the automobile body, and a third spring arranged between the saddle member and the load-carrying member to act upon the load-carrying member in opposition to the said two springs.

3. A shock absorber comprising a saddle member formed to lie upon an automobile axle and provided with a portion straddling the automobile axle and forming two upwardly-presented spring seats one at each side of the axle, a load-carrying member formed for pivotal attachment to a shackle pin, said load-carrying member having a pair of separated spring seats alined with the spring seats of the saddle member and separated to straddle the load-carrying spring of the automobile, said load-carrying member being formed to receive the shackle of the load-carrying spring and also having a third spring seat, two springs arranged between the saddle member and the load-carrying member to receive the vertical load of the automobile body, and a third spring arranged between the saddle member and the load-carrying member to act upon the load-carrying member in opposition to the said two springs.

4. A shock absorber comprising a saddle member formed to lie upon an automobile axle and provided at one end with a yoke straddling such axle and presenting two spring seats one at each side of the axle and provided at the other end with a third spring seat, a pivotally supported load-carrying member associated with said saddle member and formed at one end with a pair of laterally separated downwardly-presented spring seats alined with the pair of spring seats of the saddle member, two springs arranged between the seats of the saddle member and load-carrying member, a third spring seat carried by the load-carrying member, and a third spring arranged between the saddle member and the load-carrying member and acting upon the load-carrying member in opposition to the said two springs, said load-carrying member being also formed to receive a connection with the load-carrying spring of the vehicle.

5. A shock absorber comprising a saddle member formed to lie upon an automobile axle and provided at one end with a yoke straddling such axle and presenting two spring seats one at each side of the axle and provided at the other end with a third spring seat, a load-carrying member pivoted upon the saddle member and formed at one end with a pair of laterally separated downwardly-presented spring seats alined with the pair of spring seats of the saddle member, two springs arranged between the seats of the saddle member and load-carrying member, a third spring seat carried by the load-carrying member, and a third spring arranged between the saddle member and the load-carrying member and acting upon the load-carrying member in opposition to the said two springs, said load-carrying member being also formed to receive a connection with the load-carrying spring of the vehicle.

6. A shock absorber comprising a saddle member formed to lie upon an automobile axle and provided at one end with a yoke straddling such axle and presenting two spring seats one at each side of the axle and provided at the other end with a third spring seat, a load-carrying member pivoted upon the saddle member and formed at one end with a pair of laterally separated downwardly-presented spring seats alined with the pair of spring seats of the saddle member, two springs arranged between the seats of the saddle member and load-carrying member, a third spring seat carried by the load-carrying member, and a third spring arranged between the saddle member and the load-carrying member and acting upon the load-carrying member in opposition to the said two springs, said load-carrying member being also formed to receive a connection with the load-carrying spring of the vehicle, the third spring seat of the load-carrying member lying between the fulcrum of said member and the laterally separated spring seats.

7. A shock absorber comprising a saddle member provided at an intermediate point with a substantially vertical perforated portion adapted to receive a horizontal fastening member carried by the axle of an automobile, a load-carrying member pivoted upon the saddle member upon a horizontal axis, a spring interposed between the saddle member and load-carrying member to oppose downward movement of the load-carrying member, and a spring interposed between the saddle member and the load-carrying member to oppose upward movement of the load-carrying member, said load-carrying member being formed to receive a connection with the load-carrying spring of an automobile.

8. A shock absorber comprising a saddle member having a substantially vertical portion at an intermediate point to receive a substantially horizontal clamping member carried by an automobile axle and also having at one end two upwardly presented spring seats arranged to lie alongside an automobile axle, and also having a third spring seat, a load-carrying member pivoted at an intermediate point to the saddle member and bifurcated at one end to form a pair of laterally separated downwardly-presented spring seats, and also formed to receive a connection with the load-supporting spring of an automobile, two compression springs arranged between the pair of spring seats of the saddle member and the pair of spring seats of the load-carrying member, and a third spring arranged between the third spring seat of the saddle member and the load-carrying member and acting upon said load-carrying member in opposition to the other two springs.

9. A shock absorber comprising a saddle member provided at an intermediate point with a substantially horizontal fastener by means of which it may be fastened to the axle of an automobile, a load-carrying member pivoted upon the saddle member upon a horizontal axis, a spring interposed between the saddle member and load-carrying member to oppose downward movement of the load-carrying member, and a spring interposed between the saddle member and load-carrying member to oppose upward movement of the load-carrying member, said load-carrying member being formed to receive a connection with the load-carrying body of the automobile.

10. A shock absorber comprising a saddle piece adapted to lie upon an automobile axle and provided with a portion through which the fastening portion of a shackle pin may be passed, a load-carrying member formed for pivotal attachment to such shackle pin, said load-carrying member being formed to receive a connection with the load-carrying body of an automobile, a spring arranged to take the downward thrust of the load-carrying member, and another spring arranged to take the upward thrust of the load-carrying member, said two springs acting simultaneously upon the load-carrying member in opposite directions relative to its pivotal support on the shackle pin.

11. A shock absorber comprising a pivotally supported load-carrying member, two springs arranged to act upon said load-carrying member in opposite directions upon the same side of the axis of said member, the inherent periods of vibration of said springs being different, and a connection between said load-carrying member and the load-carrying body of the vehicle.

12. A shock absorber comprising a pivotally supported load-carrying member, two springs arranged to act upon said load-carrying member in opposite directions upon the same side of the axis of said member, the inherent periods of vibration of said springs being different, and a connection between said load-carrying member and a spring carried by the main body of the automobile.

13. In a shock absorber, the combination with the axle and the load-carrying spring, of a spring-seat member attached to one of the aforesaid parts and provided with two spring seats respectively on opposite sides of said part, a lever interconnected with both said axle and said load-carrying spring, the connection of said lever to one of said parts comprising a shackle interconnecting said lever and said part and that to the other being on a fixed pivot point, said lever being provided with two spring seats opposed to the spring seats on said spring-seat member, and two compression springs arranged between the spring seats of the spring-seat member and the corresponding spring-seats of the lever.

14. In a shock absorber, the combination with the axle and the load-carrying spring, of a spring-seat member attached to one of the aforesaid parts and provided with two spring seats respectively on opposite sides of said part, a lever interconnected with both said axle and said load-carrying spring, the connection of said lever to one of said parts being on a fixed pivot point, said lever being provided with two spring seats opposed to the spring seats on said spring-seat member, and two compression springs arranged between the spring seats of the spring-seat member and the corresponding spring seats of the lever.

15. In a shock absorber, the combination with two relatively movable parts of a vehicle, of a spring-seat member attached to one of said parts and provided with a pair of spring seats respectively on opposite sides of said part, a lever associated with said parts and having two spring seats opposed to the spring seats of said spring-seat member, the connection of said lever to one of said parts being on a fixed pivot point, and two compression springs arranged between the spring seats of said spring-seat member and the corresponding spring seats on said lever.

16. In a shock absorber, the combination with two relatively movable parts of a vehicle, of a spring-seat member attached to one of said parts and provided with a pair of spring seats respectively on opposite sides of said part, a lever associated with said parts and having two spring seats opposed to the spring seats of said spring-seat member, the connection of said lever to one of said parts being on a fixed pivot point, and two compression springs arranged between the spring seats of said spring-seat member and the corresponding spring seats on said lever, said first spring seats being so located with respect to the part which carries said spring-seat member that said part is overlapped on opposite sides by said two compression springs.

17. In a shock absorber, the combination with the axle and the load-carrying spring, of a spring-seat member attached to one of the aforesaid parts and provided with two spring seats respectively on opposite sides of said part, a lever interconnected with both said axle and said load-carrying spring, the connection of said lever to one of said parts being on a fixed pivot point, said lever being provided with two spring seats opposed to the spring seats on said spring-seat member, and two compression springs arranged between the spring seats of the spring-seat member and the corresponding spring seats of the lever, said first spring seats being so located with respect to the part which carries said spring-seat member that said part is overlapped on opposite sides by said two compression springs.

18. A shock absorber for vehicles, comprising a saddle piece adapted to lie upon a vehicle axle and provided with a portion through which the fastening portion of a shackle pin may be passed, a load-carrying member formed for pivotal connection to such shackle pin and to a main load-carrying spring of the vehicle, and a spring acting between said load-carrying member and said saddle piece.

19. A shock absorber for vehicles, comprising a saddle piece adapted to lie upon a vehicle axle and provided with a portion through which the fastening portion of a shackle pin may be passed, a load-carrying member formed for pivotal attachment to such shackle pin, said load-carrying member being formed for pivotal attachment to the shackle of a main load-carrying spring of the vehicle, and a spring acting between said load-carrying member and said saddle piece.

20. The combination with a vehicle axle, vehicle body, transverse spring supporting said body, and perch carried by the axle beyond the end of said spring, of a lever directly pivoted to the perch and projecting inwardly beyond the body spring, a swinging shackle below and depending from the lever and pivotally connected to the vehicle spring to support the same, and a spring arranged beneath the vehicle spring and supported by the axle and supporting the lever.

21. The combination with a vehicle axle, vehicle body, transverse spring supporting said body, and perch carried by the axle beyond the end of said spring, of a lever directly pivoted to the perch and projecting inwardly, a swinging shackle below and depending from the lever and pivotally connected to the vehicle spring to support the same, and a spring supported by the axle and supporting the lever.

In witness whereof, I have hereunto set my hand at Indianapolis, Indiana, this 6th day of May, A. D. one thousand nine hundred and eighteen.

LOUIE H. OBERREICH.